United States Patent
Pfeiffer et al.

(10) Patent No.: US 8,893,108 B1
(45) Date of Patent: Nov. 18, 2014

(54) METHOD AND SYSTEM FOR CONTEXT-BASED SOFTWARE UPDATES

(75) Inventors: Jefrey O. Pfeiffer, Lewisville, TX (US); Michael Joe Rainwater, Frisco, TX (US)

(73) Assignee: Intuit Inc., Mountain View, CA (US)

( * ) Notice: Subject to any disclaimer, the term of this patent is extended or adjusted under 35 U.S.C. 154(b) by 1702 days.

(21) Appl. No.: 11/932,339

(22) Filed: Oct. 31, 2007

(51) Int. Cl.
*G06F 9/45* (2006.01)
*G06F 17/22* (2006.01)

(52) U.S. Cl.
USPC ........... 717/171; 717/168; 717/172; 717/173; 705/31

(58) Field of Classification Search
CPC ...................................................... G06F 17/30
See application file for complete search history.

(56) References Cited

U.S. PATENT DOCUMENTS

| | | | | |
|---|---|---|---|---|
| 4,972,328 | A * | 11/1990 | Wu et al. | 706/59 |
| 5,933,139 | A * | 8/1999 | Feigner et al. | 715/708 |
| 6,246,404 | B1 * | 6/2001 | Feigner et al. | 715/708 |
| 7,153,350 | B2 * | 12/2006 | Auslander et al. | 106/31.32 |
| 7,251,812 | B1 * | 7/2007 | Jhanwar et al. | 717/171 |
| 7,305,672 | B2 * | 12/2007 | Vincent | 717/172 |
| 7,313,792 | B2 * | 12/2007 | Buban et al. | 717/170 |
| 7,631,260 | B1 * | 12/2009 | Riggs et al. | 715/716 |
| 7,685,032 | B2 * | 3/2010 | Zias et al. | 705/31 |
| 7,685,033 | B2 * | 3/2010 | Talan et al. | 705/31 |
| 7,694,294 | B2 * | 4/2010 | Bukovec et al. | 717/173 |
| 7,774,425 | B2 * | 8/2010 | Jin et al. | 709/217 |
| 7,865,829 | B1 * | 1/2011 | Goldfield et al. | 715/708 |
| 8,230,415 | B1 * | 7/2012 | Thomas | 717/173 |
| 8,341,617 | B2 * | 12/2012 | Bunn | 717/168 |
| 8,645,942 | B2 * | 2/2014 | Maj | 717/172 |
| 2002/0133410 | A1 * | 9/2002 | Hermreck et al. | 705/19 |
| 2002/0156889 | A1 * | 10/2002 | Crudele et al. | 709/224 |
| 2003/0212716 | A1 * | 11/2003 | Steele et al. | 707/203 |
| 2005/0119910 | A1 * | 6/2005 | Schneider | 705/1 |
| 2005/0149922 | A1 * | 7/2005 | Vincent | 717/172 |
| 2005/0216906 | A1 * | 9/2005 | Shahindoust et al. | 717/171 |
| 2005/0273779 | A1 * | 12/2005 | Cheng et al. | 717/168 |
| 2006/0155618 | A1 * | 7/2006 | Wyle | 705/31 |
| 2006/0178961 | A1 * | 8/2006 | Stanley et al. | 705/31 |

(Continued)

OTHER PUBLICATIONS

Shuo Chen et al., "Side-Channel Leaks in Web Applications: a Reality Today, a Challenge Tomorrow", [Online], IEEE 2010, pp. 191-206, [Retrieved from Internet on Jul. 22, 2014], <http://ieeexplore.ieee.org/stamp/stamp.jsp?tp=&arnumber=5504714>.*

(Continued)

*Primary Examiner* — Thuy Dao
*Assistant Examiner* — Ziaul A Chowdhury
(74) *Attorney, Agent, or Firm* — Osha Liang LLP

(57) ABSTRACT

A method for updating a software program, including: determining a context of the user while the user is using the software program; subscribing to an update service associated with the context of the user; obtaining at least one update related to the context of the user, where at least one update is supplied by the update service; and updating the software program based on at least one update.

11 Claims, 5 Drawing Sheets

(56) References Cited

U.S. PATENT DOCUMENTS

| | | | |
|---|---|---|---|
| 2006/0217126 A1* | 9/2006 | Sohm et al. | 455/454 |
| 2007/0156809 A1* | 7/2007 | Dickinson et al. | 709/203 |
| 2007/0168367 A1* | 7/2007 | Dickinson et al. | 707/100 |
| 2007/0179841 A1* | 8/2007 | Agassi et al. | 705/14 |
| 2007/0185792 A1* | 8/2007 | Naib et al. | 705/31 |
| 2007/0220505 A1* | 9/2007 | Bukovec et al. | 717/168 |
| 2008/0147528 A1* | 6/2008 | Talan et al. | 705/31 |
| 2008/0208864 A1* | 8/2008 | Cucerzan et al. | 707/8 |
| 2008/0244509 A1* | 10/2008 | Buchs et al. | 717/106 |
| 2009/0193409 A1* | 7/2009 | Dave et al. | 717/173 |
| 2011/0145805 A1* | 6/2011 | Taylor et al. | 717/168 |

OTHER PUBLICATIONS

Hau L. Lee et al., "E-Business and Supply Chain Integration", [Online], 2001, pp. 1-20, [Retrieved from Internet on Jul. 22, 2014], <http://www.sclgme.org/shopcart/Documents/EB_SCI.pdf>.*

Mario R. Barbacci, "Software Quality Attributes: Modifiability and Usability", [Online], 2004, pp. 1-23, [Retrieved from Internet on Jul. 22, 2014], <http://www.ieee.org.ar/downloads/Barbacci-05-notasl.pdf>.*

Iravani F. et al., "A Hierarchical Framework for Organizing a Software Development Process", [Online], pp. 1-39, [Retrieved from Interenet on Jul. 22, 2014], <http://escholarship.org/uc/item/6cg5z5js#page-1>.*

* cited by examiner

METHOD AND SYSTEM FOR CONTEXT-BASED SOFTWARE UPDATES

BACKGROUND

In a general sense, software may be used to perform a set of tasks desired by a user. Software may also include the data used by an application or a user to perform a task. For example, the content within "help" files or a table of tax rates used by a tax program may also be considered software. Examples of software include word processors, spreadsheets, databases, media players, business applications, and medical applications. Software may be bundled with the operating system installed on a computer, installed separately, and/or accessed remotely (e.g., over a network connection).

Software may also be associated with various features for performing the user's tasks. For example, media players may include features for visualization of music and creation of compact discs (CDs) and/or digital video discs (DVDs) from media files. In addition, the features may be tailored to the user's needs and/or capabilities. A more advanced user of the software may require more advanced and/or complicated features than a basic user. As a result, most users may only use a portion of the features offered by an application.

Software may be updated frequently, particularly if the software includes many features and/or multiple advanced features. Software updates may be used to fix security leaks, fix bugs, update data, install new features, upgrade existing features, and/or provide other changes to the product software. Software users may be prompted to download and install an update whenever the update is released. The update is prompted even when the update only involves a feature of the software the user has never used and has no plan to use the feature in the future.

SUMMARY

In general, in one aspect, the invention relates to a method for updating a software program. The method includes determining a context of the user while the user is using the software program; subscribing to an update service associated with the context of the user; obtaining at least one update related to the context of the user, where at least one update is supplied by the update service; and updating the software program based on at least one update.

In general, in one aspect, the invention relates to a system for updating a software program. This system includes a plurality of usage contexts for the software program, where each update of a plurality of updates to the software program is associated with each usage context based on the relevance of the update to the usage context; an update service comprising a network protocol or technology to obtain each update, where the update service is associated with a unique one of the plurality of usage contexts; and an update module operatively connected to the update service, where the update module is configured to: determine a usage context of the plurality of contexts based on a context of a user while the user is using the software program; subscribe to the update service associated with the context of the user; obtain each update related to the context of the user, where each update is supplied by the update service; and updating the software program based on each update.

In general, in one aspect, the invention relates to a computer readable medium including computer program code to update a software program under control of a processor. The computer program code includes instructions to: determine a context of a user while the user is using the software program; subscribe to an update service associated with the context of the user; obtain at least one update related to the context of the user, where at least one update is supplied by the update service; and update the software program based on at least one update.

Other aspects of the invention will be apparent from the following description and the appended claims.

DETAILED DESCRIPTION

Figure 1:
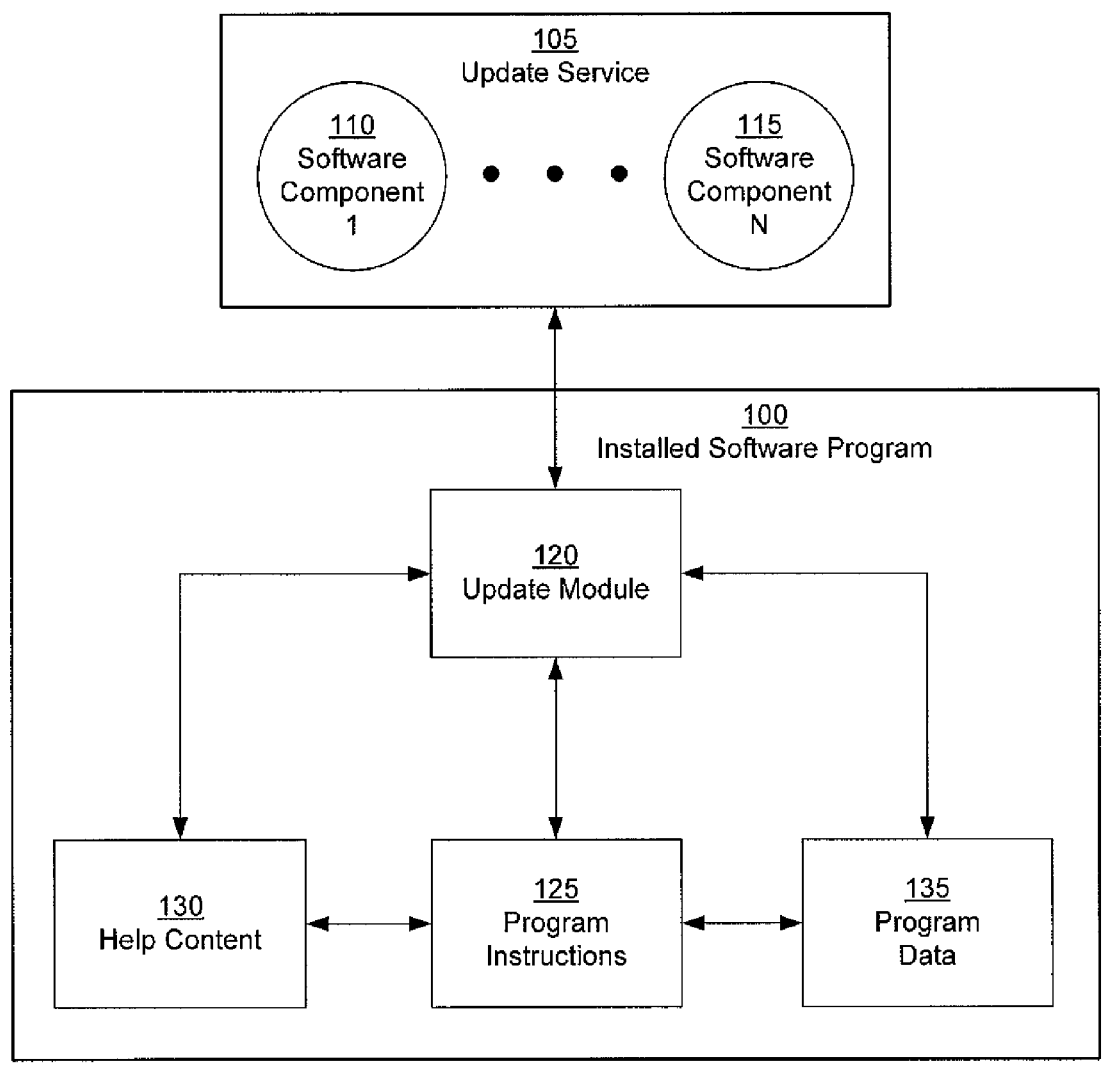
FIGS. 1-2 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for context-based updating of software programs. Specifically, embodiments of the invention provide a method and system for updating a software program based on a user's context within the software program. In one more embodiments of the invention, usage contexts are defined for a software program that is executed on users' computing systems. The usage contexts may be defined, for example, based on anticipated usage patterns, features of the software program, datasets used by the software program, and help content provided by the software program. Software updates (which may include data) are formulated into discrete components or parts according to what is dictated by the design and requirements of a software program. These components may have defined dependencies and relationships with other components, or they may be atomic in nature. Established relationships may exist between the usage context and these updateable software components. These relationships are then used to provide the appropriate software updates related to the usage context.

An example of a feed is as a Really Simple Syndication (RSS) feed, which is established for each usage context. These feeds are then used to provide updates for the software program related to the usage contexts of the feeds. More specifically, as a user uses the software program, the user's context within the software program is used to determine when an update may be needed. When appropriate, the feed for the usage context may be used to download updates for the software program that are specific to the usage context.

Thus, embodiments of the invention allow updates for downloading a software program and updates being performed, only as needed, based on a user's actual use of the software program. Further, relevant software updates are provided to users without requiring additional time, bandwidth, and/or processing power to download and install unnecessary updates.

FIG. 1 shows a schematic diagram of a system in accordance with one or more embodiments of the invention. As shown in FIG. 1, the system includes a software program (100) and an update service (105). Each of these components is described in further detail below.

In one or more embodiments of the invention, the software program (100) may be a desktop application, a web application, a service plan, or other software program. Examples of software programs (100) include operating systems, integrated development environments (IDEs), industrial automation software, word processing software, financial management software, business software, medical software, computer games, cellular service plans, databases, and/or any other type of software installed on a computing system. Other examples of software programs may include data only, with no application. For example: recipes, photographs, movies—such data can then used by another software program In one or more embodiments of the invention, the software program (100) may execute on a user computing system (not shown) that communicates with the update service (105) through one or more network connections and protocols. A user computing system may be a personal computer, a mobile phone, a personal digital assistant (PDA), or any other computing device. Further, in one or more embodiments of the invention, the software program (100) may be installed on a computing system (e.g., a server, a personal computer, or any other suitable computing device) accessible by a user through one or more interfaces (not shown). In one or more embodiments of the invention, a user may be a person, another software program, a device, or any other entity capable of using the software program (100).

In one or more embodiments of the invention, the software program (100) may be used by the user to perform a set of tasks. For example, the user may use financial management software to create a budget, balance his/her checkbook, track his/her spending and investments, track phone usage, file tax returns, and perform other finance-related functions. In addition, the software program (100) may include multiple features to help the user perform the tasks. For example, financial management software may include a feature for generating charts and graphs of the user's finances, as well as another feature for downloading banking, credit card, and investment information.

As shown in FIG. 1, the software program (100) includes program instructions (125), help content (130), program data (135), and an update module (120). The program instructions (125) are software code (or other forms of instructions), which is executed by a computing system to run the software program (100). The software program (100) may be executed using an operating system, or the software program (100) may be one or more parts of the operating system. The software program (100) may also include low-level software programs such as a basic input output system (BIOS) or embedded software.

The program data (135) is data that may be used by the program instructions (125) to perform tasks for the users. For example, tax preparation software may include program data such as tax forms for one or more tax years to facilitate completion and filing of tax returns. Word processing software may include program data such as templates, clip art, dictionaries, thesauruses, and/or other data to facilitate the creation of documents.

Help content (130) is provided to assist users in using one or more features of the software program (100). Help content (130) may be associated with operating systems and/or application software. In addition, help content (130) may be searched and/or browsed by users to find answers to questions and/or problems associated with using the software program (100). Help content may also be associated with a utility, such as a virtual assistant, as well as mechanisms for requesting help from technical support and/or customer support. Help content (130) may be accessed, for example, by opening an indexed listing of help topics, searching for a particular keyword or topic, connecting to one or more websites, activating the virtual assistant, sending a message to a representative, and/or triggering a pop-up within the software program (100). Further, help content (130) may occasionally require updates to the content, style, and/or to reflect a content change associated with a new version of the software program (100). These updates to the help file may be performed dynamically or as part of a batch update. Those skilled in the art will appreciate that software programs may include portions other than program instructions, help content, or program data.

Those skilled in the art will appreciate that the software program (100) may have errors (i.e., bugs), security leaks, older features, outdated and/or inaccurate program data (135), and/or outdated and/or inaccurate help content (130). As a result, mechanisms may be implemented to fix errors and/or inaccuracies in the installed software (100) as well as provide feature upgrades to the software program (100). Specifically, updates to the software program (100) may be provided to fix problems and enhance the functionality and usability of the software program (100). Updates may include patches to the program instructions (125), executable files, data files, help files, and/or any other suitable form of update.

As shown in FIG. 1, the update service (105) is a service that provides updates for the software program (100). In one or more embodiments of the invention, the update service (105) is provided by the business entity that also develops and maintains the software program (100). Further, the update service (105) may be implemented on one or more servers provided by the business entity.

In one or more embodiments of the invention, the update service (105) includes a number of updateable software components (e.g., software component 1 (110), software component n (115)). These components (e.g., software component 1 (110), software component n (115)) can be accessed by the update module (120) using any number of network protocols or technologies including (but not limited to) Really Simple Syndication (RSS) feeds as well as SOAP, and other network protocols including proprietary communication protocols. In this manner, updates are provided to the software program (100). As is explained in more detail in reference to FIG. 2 below, in one or more embodiments of the invention, the updates (including the updateable software component (e.g., software component 1 (110), software component n (115)) available from the update service (105) may be categorized according to applicability to usage contexts such as, for example, specific features, capabilities, types of program data (135), and help content (130) files of the software program (100). For example, usage contexts in tax preparation software may be based on the filing requirements (e.g., federal, state, or local) of users, features (e.g., deduction finder and investment management) of the tax preparation software, individual tax forms and/or related groups of tax forms, and/or sets of instructions (i.e., help content) for explaining the tax forms.

In one or more embodiments of the invention, the update service (105) may provide zero or many updateable software components ((e.g., software component 1 (110), software component n (115)) for each defined usage context of the software program (100). The updateable software components are determined by the relationships of the various updateable software components as well as the relationships to the defined software context. Such relationships may be maintained in a mapping table or other data structure with functionality to maintain mappings between a usage context and the updateable software components. In one or more embodiments of the invention, the update service (105) publishes the updates using a defined communication protocol, such as a RSS feed, which may be received by the update module (120) after subscription to the RSS feeds. Consequently, by subscribing only to relevant updates using the update service (105), the overall number of updates to the software (100) may be minimized and downtime reduced. The updates may include patches to fix bugs and/or security leaks within the program instructions (125), files for updating the program data (135), and/or help files for updating the help content (130).

In one or more embodiments of the invention, the update module (120) monitors the user's context as the user uses the software program (100) to determine when the user enters a context that is related to one of the usage contexts. In some embodiments of the invention, the program instructions (125) may include functionality to communicate with the update module (120) when the user begins using a part of the software program (100) that is related to one of the usage contexts. In one or more embodiments of the invention, a user may be subscribed to each RSS feed available for the software program (100) at the time the software program is installed and/or as new RSS feeds for newly defined usage categories are made available by the update service (105). In some embodiments of the invention, the user is subscribed to the update service (105) to supply an updateable software component (e.g., software component 1 (110), software component n (115)) based on a usage context the first time the user uses the software program (100) in accordance with the usage context.

Those skilled in the art will appreciate that the update module (120) may be part of the software program (100) as shown in FIG. 1, may be part of the update service (105), or may be provided as a third party service. For example, the update module may reside on a server that is part of the update service (105) and may communicate with the software program (100) using network protocols and/or remote communication methods. Alternatively, the update module may reside on a server provide by a third party and may communicate with the update service (105) and the software program (100) using network protocols and/or remote communication methods.

Figure 2:
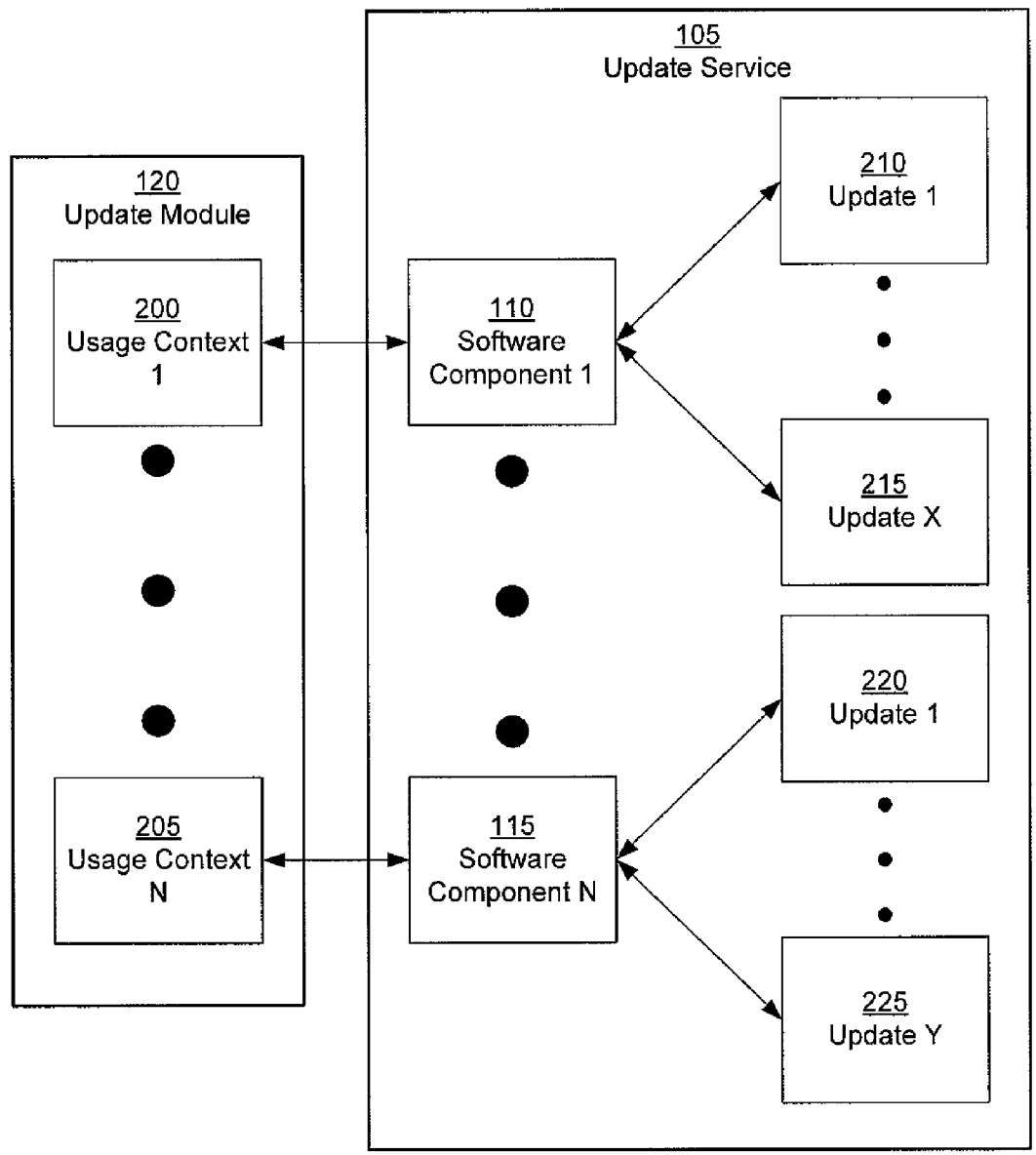

FIG. 2 shows a schematic diagram of a system for transmitting updates between the update service (105) and the update module (120) in accordance with one or more embodiments of the invention. As mentioned previously, the update service (105) includes multiple updateable software components (one for each defined usage context (e.g., usage context 1 (200), usage context n (205)) of a software program (100). In one or more embodiments, updates (e.g., update 1 (210), update x (215), update 1 (220), update y (225)) are categorized according to relevance to each usage context and are published using the update service (105) according to the particular usage context. Although not specifically shown in FIG. 2, one of ordinary skill in the art will appreciate that updates may be relevant to more than one usage context and therefore may associated with more than one updateable software component. Further, those skilled in the art will appreciate that the update (e.g., update 1 (210), update x (215), update 1 (220), update y (225)) may be published using RSS or any other feed formats, such as the Atom Syndication Format or feed formats including extensible markup language (or similar approaches).

As described above, usage contexts (e.g., usage context 1 (200), usage context n (205)) may be defined based on anticipated usage patterns, specific features, capabilities, types of program data (135), and help content (130) files of the software program (100). Further, in one or more embodiments of the invention, usage contexts (e.g., usage context 1 (200), usage context n (205)) may be defined at various levels of granularity for the software program (100). For example, a usage context (e.g., usage context 1 (200), usage context n (205)) may be defined for a particular feature of the software program (100), the program data (135), and/or the help content (130) for the software program (100). Further, a usage context (e.g., usage context 1 (200), usage context n (205)) may be defined for a sub-feature of the feature, a subset of the program data (135), or a particular file within the help content (130). Thus, usage contexts (e.g., usage context 1 (200), usage context n (205)) of varying granularity may be used to optimally provide updates for the software program (100).

For example, if users of tax preparation software typically use a certain subset of the available tax forms, a usage context may be defined for that subset of tax forms. In addition, if most users of the tax preparation form use a specific tax form, a usage context may be defined for the specific tax form. Further, tax preparation software may include help content for tax forms that is based on instructions for those tax forms available from the taxing entity. A usage context may be defined such that updates for the instructions relevant to a tax form are provided with updates to the tax form. Or, a usage context may be defined for a set of instructions corresponding to a particular portion a tax form.

As previously mentioned, in one or more embodiments of the invention, when the update module (120) determines that the context of a user using the software program (100) is related to one of the usage contexts (e.g., usage context 1 (200), usage context n (205)), the update module then uses the update service (105) to determine whether to provide the updateable software component(s) (e.g., software component 1 (110), software component n (115)) based on the usage context.

As an example, in one or more embodiments of the invention, the update module (120) subscribes the user to a RSS feed. In one or more embodiments of the invention, the first time the user's context within the software program (100) is related to a usage context (e.g., usage context 1 (200), usage context n (205)), the user is subscribed to the RSS feed. The RSS feed publishes to the update module (120) the updates for the usage context that have become available since the last time the update module (120) accessed the RSS feed for updates. In the case of an initial subscription to the RSS feed, the RSS feed publishes all updates for the usage context to the update module (120).

For example, if a user of tax preparation software is currently filling out two of four tax forms, the user may be associated with two usage contexts (e.g., usage context 1 (200), usage context n (205)) corresponding to the two tax forms currently accessed. The user may then be subscribed to RSS feeds corresponding to the two usage contexts (e.g., usage context 1 (200), usage context n (205)) established for the user.

As a result, the user may receive updates (e.g., update 1 (210), update x (215), update 1 (220), update y (225)) to the two tax forms currently used through the RSS feeds. However, the user may not receive updates (e.g., update 1 (210), update x (215), update 1 (220), update y (225)) to usage contexts (e.g., usage context 1 (200), usage context n (205)) not established for the user. As a result, the user may not receive updates (e.g., update 1 (210), update x (215), update 1 (220), update y (225)) to the remaining, unused tax forms until the user begins using the remaining tax forms. Similarly, the user may not receive updates (e.g., update 1 (210), update x (215), update 1 (220), update y (225)) to help content in the tax preparation software until the user accesses the help content.

Alternatively, the user may manually specify usage contexts (e.g., usage context 1 (200), usage context n (205)) and receive updates (e.g., update 1 (210), update x (215), update 1 (220), update y (225)) using the RSS feeds for the specified usage contexts. For example, a user of financial management software may request updates for features of the product he/she anticipates using, even if the user has not used the features yet. As mentioned above, usage contexts (e.g., usage context 1 (200), usage context n (205)) may also be established based on the user's requirements with respect to the software product. For example, a user of tax preparation software may require the use of one or more federal tax forms, as well as one or more state tax forms and/or one or more local tax forms. Though the user may not access all forms at the same time, usage contexts (e.g., usage context 1 (200), usage context n (205)) for each of the forms may be established based on the user's requirements, and the user may receive updates (e.g., update 1 (210), update x (215), update 1 (220), update y (225)) through the RSS feeds associated with the usage contexts. As a result, a user may receive software updates (e.g., update 1 (210), update x (215), update 1 (220), update y (225)) based on the user's preferences, requirements, and/or current use of various features of the software.

In one or more embodiments of the invention, updates (e.g., update 1 (210), update x (215), update 1 (220), update y (225)) to a usage context (e.g., user context 1 (200), user context n (205)) include the most recent update, as well as past updates. The updates (e.g., update 1 (210), update x (215), update 1 (220), update y (225)) are published in the RSS feed for the usage context and downloaded for updating the software program by the update module (120). The updates (e.g., update 1 (210), update x (215), update 1 (220), update y (225)) may include all updates since the release and/or most recently installed update corresponding to the user context. For example, if the usage context (e.g., usage context 1 (200), usage context n (205)) corresponds to a release and/or update six months prior to the most recent update (e.g., update 1 (210), update x (215), update 1 (220), update y (225)), the update module (120) may obtain and update the software application using all updates from the last six months.

Figure 3:
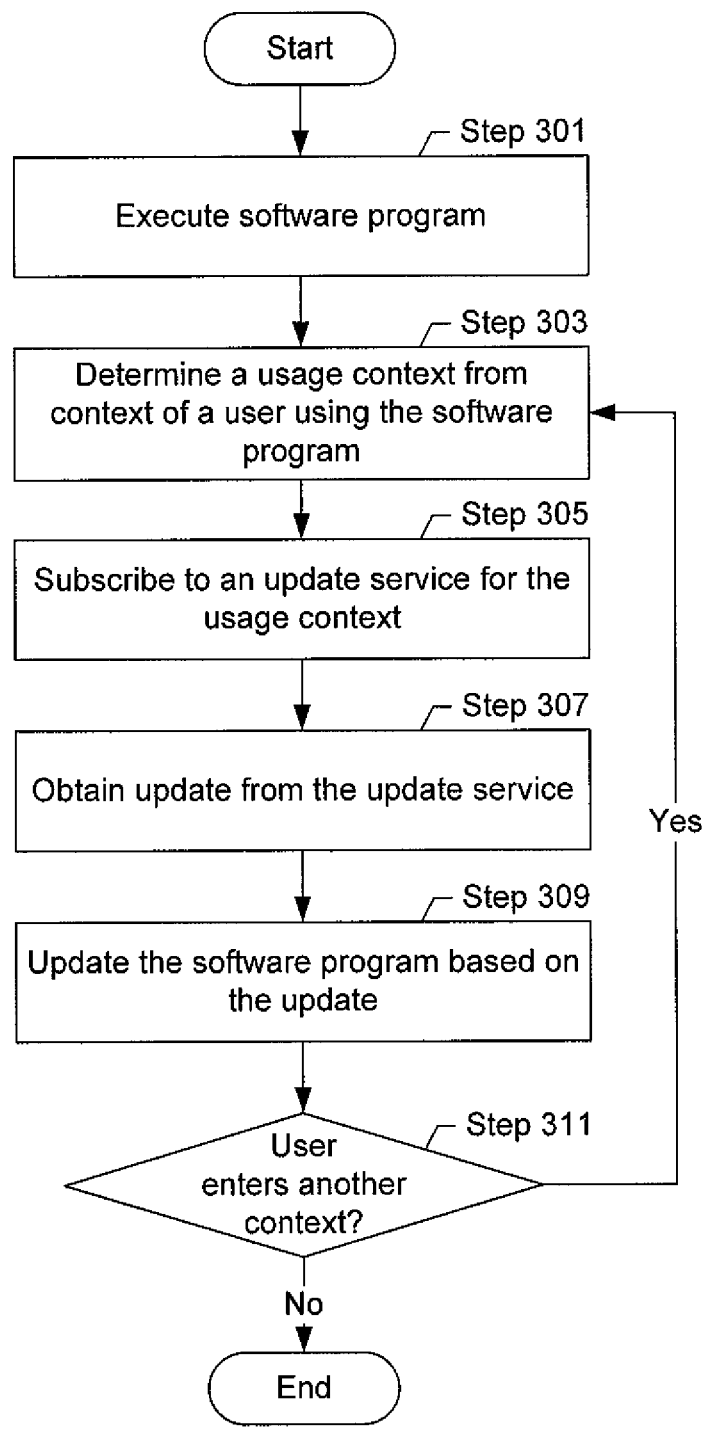
FIGS. 3-4 show flow diagrams in accordance with one or more embodiments of the invention.
Figure 4:
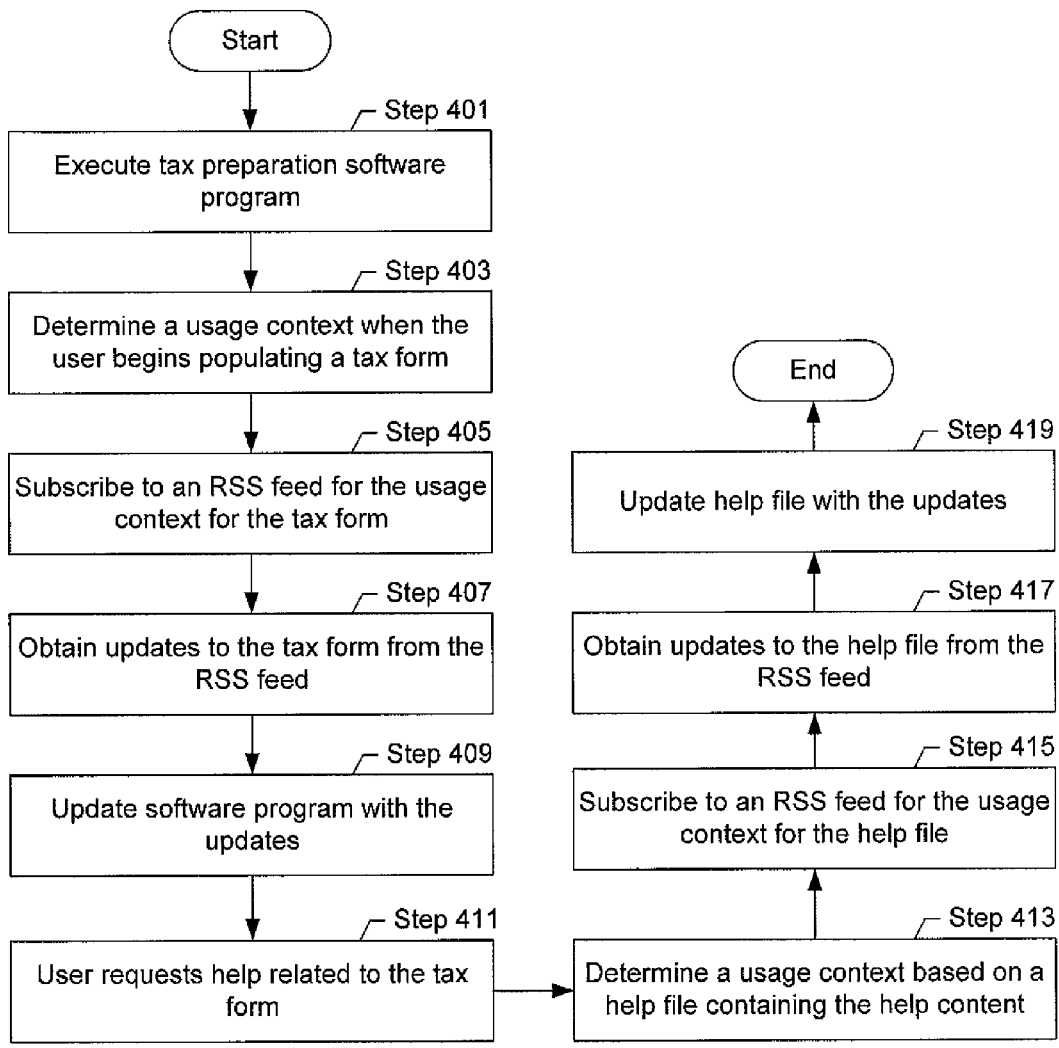

FIGS. 3 and 4 show flow diagrams in accordance with one or more embodiments of the invention. In one or more embodiments of the invention, one or more of the steps described below may be omitted, repeated, and/or performed in a different order. Further, one or more of the steps may be performed concurrently with other steps. Accordingly, the specific arrangement of steps shown in FIGS. 3 and 4 should not be construed as limiting the scope of the invention.

FIG. 3 shows a flow diagram of context-based software update in accordance with one or more embodiments of the invention. Initially, a software program is executed (Step 301). The executing software program may be, for example, desktop application software or operating system software that executes on a personal computer. The executing software program may also include low-level software such as a BIOS or embedded software. The executing software may be installed by a user of the computer, or pre-installed by an administrator before the computer is used by the user. The user uses the software program and a usage context is determined from the context of the user using the software program (Step 303). As described above, usage contexts may be defined based on such things as features of the software program, predicted use of the software program, subsets of the program data used by the software program and/or subsets of any help content provided by the software program. In addition, some usage contexts, such as those for security and/or for fixing major bugs, may also be defined.

The user is subscribed to an update service with updateable software components associated with the usage context (Step 305). As mentioned above, the update may be provided by RSS or other feed formats, such as Atom or other network compatible feeds. In one or more embodiments of the invention, the user is subscribed to the update service the first time the user's context is determined to be related to the usage context while using the software program.

An available update for the usage context is obtained from the update service (Step 307) and the software program is updated based on the available update (Step 309). Further, in one or more embodiments of the invention, the user is prompted for approval of the update before updating the software program. Because the updateable software component of the update service is associated with the context of the user, the user only receives updates for the usage context through the update service.

As the user continues to use the software program, the user may enter other contexts while using the program that are related to other usage contexts (Step 311). The steps of determining a usage context (Step 303), subscribing to a usage service with a updateable usage service associated with the usage context (Step 305), obtaining an update from the update service (Step 307), and updating the software program (Step 309) are repeated (as needed) based on the user's continued use of the software program. Thus, updates are automatically updated when the user actually uses some aspect of the software program, rather than requiring the user to update the software program using all available updates, regardless of whether the user actually uses the aspects of the software program affected by the updates.

FIG. 4 shows a flow diagram of an example of updating a tax preparation software program in accordance with one or more embodiments of the invention. As a mere example, the invention should not be limited to the particular update service or feed discussed below.

Initially, the tax preparation software program is executed (Step 401). The tax preparation software program includes program data. The program data includes the format and content of tax forms. The program data may also include help content derived from tax publications and the tax code. The tax preparation software also includes program instructions (e.g., business objects and methods, persistence objects and methods, and user interface objects and methods), and other help content (e.g., help files, frequently asked questions (FAQs), and virtual assistants). In one or more embodiments of the invention, the tax preparation software program is executing on a user's personal computer. Further, the tax preparation software program may be connected to an update service that provides updates for the tax preparation software program related to the program instructions, help content, and/or program data.

The user begin using the tax preparation software program to populate a tax form and a usage context related to the tax form is determined (Step 403). The user is subscribed to one or more RSS feeds (which are part of the update service) for the usage context related to the tax form (Step 405). Available updates for the format and/or content of the tax form are obtained using the RSS feed (Step 407) and the software application executing on the user's computer in updated based on the available updates (Step 409). In one or more embodiments of the invention, the updates are downloaded in the background while the user uses the tax preparation software program. The user may also be prompted before the updates are updated, as the updating process may require a shutdown of the tax preparation software program and/or rebooting.

While populating information to the tax form, the user may request help related to the tax form (Step 411). A usage context is determined as a result of the request (Step 413). In one or more embodiments of the invention, the usage context may be for all help content for the tax preparation software program, or only the portions of the help content relevant to the user's request. The user is subscribed to the RSS feed for the usage context (Step 415) and updates to the help content are obtained using the RSS feed (Step 417) and the help file is updated (Step 419).

Figure 5:
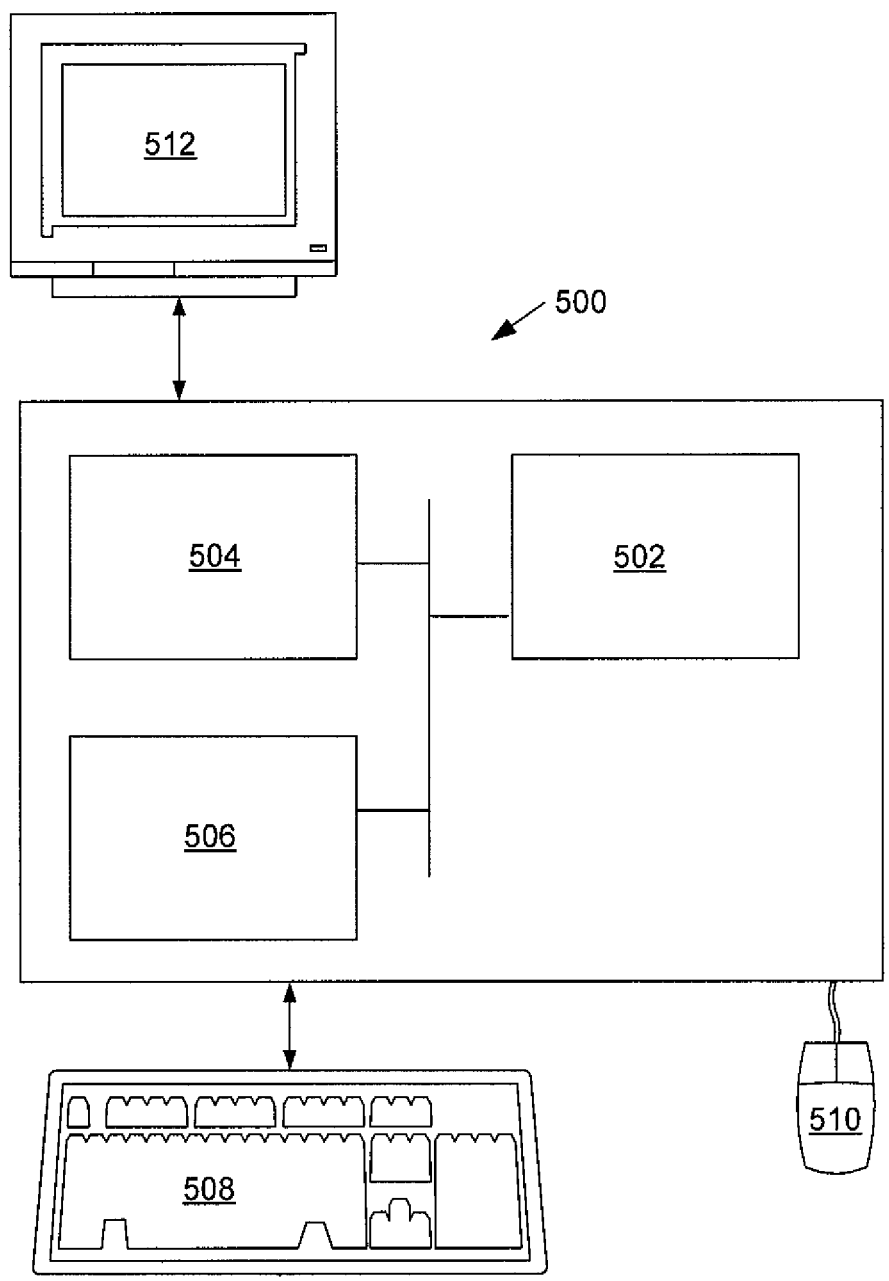
FIG. 5 shows a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., update service, update module, help content, instructions, and data) may be located on a different node within the distributed system. In one or more embodiments of the invention, the node is a computer system. In one or more embodiments of the invention, the node is a processor with associated physical memory. In one or more embodiments of the invention, the node is a processor with shared memory and/or resources. Further, software instructions to perform embodiments of the invention may be stored on a non-transitory computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for updating a tax preparation software program (TPSP), comprising:
   determining, by an update module of the TPSP, that a user of the TPSP is completing a tax form;
   identifying, by the update module of the TPSP, a software component of the TPSP associated with the tax form, wherein the update service is subscribed to the first time the user accesses the tax form;
   subscribing, by the update module of the TPSP, to an update service associated with the software component;
   identifying, by the update module of the TPSP and after subscribing to the update service, a feature of the TPSP required during completion of the tax form by the user;
   identifying, by the update module of the TPSP and after subscribing to the update service, a first update to the software component provided by the update service, wherein the first update comprises a functional modification to the feature of the TPSP;
   identifying, by the update module of the TPSP and after subscribing to the update service, a second update to the software component provided by the update service, wherein the second update does not modify the feature of the TPSP required during completion of the tax form by the user;
   obtaining, by the update module of the TPSP and in response to the first update comprising the functional modification and the second update not modifying the feature of the TPSP, the first update from the update service but not the second update; and
   updating, by the update module of the TPSP, the software component of the TPSP using the first update while the TPSP is executing.

2. The method of claim 1, wherein the update service utilizes a network protocol.

3. The method of claim 2, wherein the network protocol comprises a really simple syndication (RSS) feed.

4. The method of claim 1, wherein the first update comprises a patch.

5. A system for updating a tax preparation software program (TPSP), comprising:
   a computer processor;
   an update service associated with a software component of the TPSP and configured to:
      provide a first update to the software component; and
      provide a second update to the software component; and
   an update module executing on the computer processor, operatively connected to the update service, and configured to:
      determine that a user of the TPSP is completing a tax form associated with the software component;
      subscribe to the update service associated with the software component, wherein the update service is subscribed to the first time the user accesses the tax form;
      identify, after subscribing to the update service, a feature of the TPSP required during completion of the tax form by the user;
      identify, after subscribing to the update service, the first update to the software component comprises a functional modification to the feature of the TPSP;
      identify, after subscribing to the update service, the second update to the software
         component does not modify the feature of the TPSP required during completion of the tax form by the user,
      obtain, in response to the first update comprising the functional modification and the second update not modifying the feature of the TPSP, the first update from the update service but not the second update; and
      update the software component of TPSP using the first update while the TPSP is executing.

6. The system of claim 5, wherein the first update comprises a patch.

7. The system of claim 5, wherein the update service utilizes a really simple syndication (RSS) feed.

8. A non-transitory computer readable medium comprising a plurality of instructions for updating a tax preparation software program (TPSP), the plurality of instructions comprising functionality to:

determine, by an update module of the TPSP, that a user of the TPSP is completing a tax form;

identify, by the update module of the TPSP, a software component of the TPSP associated with the tax form;

subscribe, by the update module of the TPSP, to an update service associated with the software component, wherein the update service is subscribed to the first time the user accesses the tax form;

identify, by the update module of the TPSP and after subscribing to the update service, a feature of the TPSP required during completion of the tax form by the user;

identify, by the update module of the TPSP and after subscribing to the update service, a first update to the software component provided by the update service, wherein the first update comprises a functional modification to the feature of the TPSP;

identify, by the update module of the TPSP and after subscribing to the update service, a second update to the software component provided by the update service, wherein the second update does not modify the feature of the TPSP required during completion of the tax form by the user;

obtain, by the update module of the TPSP and in response to the first update comprising the functional modification to the feature of the TPSP and the second update not modifying the feature of the TPSP, the first update from the update service but not the second update; and update, by the update module of the TPSP, the software component of the TPSP using the first update while the TPSP is executing.

9. The non-transitory computer readable medium of claim 8, wherein the update service utilizes a network protocol.

10. The non-transitory computer readable medium of claim 9, wherein the network protocol comprises a really simple syndication (RSS) feed.

11. The non-transitory computer readable medium of claim 8, wherein the first update comprises a patch.

* * * * *